US011511496B2

(12) United States Patent
Gordon et al.

(10) Patent No.: US 11,511,496 B2
(45) Date of Patent: Nov. 29, 2022

(54) MEANS OF RETAINING A PRODUCT IN A RECEPTACLE

(71) Applicant: DOW SILICONES CORPORATION, Midland, MI (US)

(72) Inventors: Glenn V. Gordon, Midland, MI (US); Bartley D. Maxon, Midland, MI (US); Rochelle A. Nesbitt, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 445 days.

(21) Appl. No.: 16/628,764

(22) PCT Filed: Jul. 6, 2018

(86) PCT No.: PCT/US2018/041067
§ 371 (c)(1),
(2) Date: Jan. 6, 2020

(87) PCT Pub. No.: WO2019/010402
PCT Pub. Date: Jan. 10, 2019

(65) Prior Publication Data
US 2020/0139638 A1    May 7, 2020

Related U.S. Application Data

(60) Provisional application No. 62/529,197, filed on Jul. 6, 2017.

(51) Int. Cl.
*B29C 65/48* (2006.01)
*C09J 183/04* (2006.01)
*A45D 33/00* (2006.01)
*A45D 40/20* (2006.01)

(52) U.S. Cl.
CPC ......... *B29C 65/4815* (2013.01); *C09J 183/04* (2013.01); *A45D 33/003* (2013.01); *A45D 40/20* (2013.01); *A45D 2200/05* (2013.01)

(58) Field of Classification Search
CPC ..... A45D 40/00; A45D 40/20; A45D 2200/05
See application file for complete search history.

(56) References Cited

U.S. PATENT DOCUMENTS

| 2004/0042837 | A1* | 3/2004 | Luttgens | B43K 19/14 401/52 |
| 2007/0020022 | A1* | 1/2007 | Herrmann | A45D 40/20 401/88 |
| 2012/0131886 | A1  | 5/2012 | Caprarotta et al. | |
| 2015/0376482 | A1* | 12/2015 | Bekemeier | C08L 83/00 428/447 |
| 2018/0140071 | A1* | 5/2018 | Cho | B32B 5/028 |
| 2019/0200728 | A1* | 7/2019 | Kaul | B29C 45/73 |

FOREIGN PATENT DOCUMENTS

| CN | 102582078 A | 7/2012 | | |
| JP | 2001000240 A | 1/2001 | | |
| JP | 2007175218 A | 7/2007 | | |
| JP | 2010115401 A | 5/2010 | | |
| WO | WO8707822 | * 12/1987 | ............ | A45D 40/20 |
| WO | 2014124389 A1 | 8/2014 | | |
| WO | WO2018004047 | * 1/2018 | ............ | A45D 33/00 |

OTHER PUBLICATIONS

International Search Report for PCT/US2018/041067 dated Oct. 2, 2018, 4 pages.
Machine assisted English translation of JP2001000240A obtained from https://patents.google.com/patent on Jul. 28, 2022, 7 pages.
Machine assisted English translation of JP2007175218A obtained from https://patents.google.com/patent on Jul. 28, 2022, 5 pages.
Machine assisted English translation of JP2010115401A obtained from https://patents.google.com/patent on Jul. 28, 2022, 10 pages.

* cited by examiner

*Primary Examiner* — J C Jacyna

(74) *Attorney, Agent, or Firm* — Warner Norcross + Judd LLP

(57) ABSTRACT

A method of adhering a cosmetic pressed powder product or a stick type applicative product (e.g. a lipstick) inside a receptacle therefor is disclosed. The receptacle comprises a casing having a top end and a base end with a receiving base member disposed at the base end, and the receiving base member has an inner surface. The base member may be designed or adapted to be moveable inside the casing to advance and retract the product. The method comprises applying a silicone hot melt adhesive composition in liquid form to at least part of the inner surface of the receiving base member; inserting the product into the receiving base member on or in the silicone hot melt adhesive composition while still in liquid form; and cooling, and optionally curing, the silicone hot melt adhesive to adhere the product inside the receptacle. Retained-products formed via the method are also disclosed.

21 Claims, No Drawings

MEANS OF RETAINING A PRODUCT IN A RECEPTACLE

CROSS-REFERENCE TO RELATED APPLICATIONS

This application is the National Stage of International Appl. No. PCT/US2018/041067 filed on 06 Jul. 2018, which claims priority to and all advantages of U.S. Patent Application No. 62/529,197, filed on 06 Jul. 2017, the contents of which is hereby incorporated by reference.

This application claims priority to and all advantages of U.S. Patent Application No. 62/529,197 filed on 6 Jul. 2017, the contents of which is hereby incorporated by reference.

FIELD OF THE INVENTION

The present disclosure relates to receptacles for products such as cosmetic pressed powders and stick type applicative products, for example, lipsticks, lip balms, deodorant sticks, antiperspirant sticks, glue sticks, and other applicative cosmetics and a means of retaining such products within the receptacles. This disclosure also relates to a method of adhering products inside receptacles for the products, and to retained-products formed by the method.

BACKGROUND OF THE INVENTION

Receptacles for cosmetic pressed powder products and stick type applicative products generally comprise a casing having a top end and a bottom end with a receiving base member disposed at the bottom end for receiving the product concerned. The products to be housed in the receptacle have a bottom and a head with the bottom of, e.g. a stick of an applicative product such as lipstick, retained inside a receiving base member disposed within the casing of the receptacle. The receiving base member is usually designed to be rotatable or be pushed longitudinally inside the casing to advance, e.g. a stick of applicative product, longitudinally through the casing so that the head of the stick of applicative product can be exposed above the top of the casing so that it is available for application/use. In the case of a rotatable base member rotation thereof relative to the casing causes a mechanism inside the casing to advance the stick of applicative product longitudinally away from the bottom end of the casing such that the head of the stick of applicative product is exposed above the top end of the casing, available for application, in the case of a lipstick to the lips of a human. Most stick like applicative products have a cylindrical casing with a circular cross-section. Pressed powder receptacles can have a cross-section of any shape.

In the case of stick type applicative products, when the bottom of an applicative product is placed into a respective receiving base member, it is generally retained in the receiving base member via a friction fit between the applicative product and the inner wall of the receiving base member. The receiving base member and applicative product being dimensioned so that an appropriate friction fit is achieved therebetween. However, over time, this friction fit means of holding the stick of applicative product in the receiving base member becomes increasingly less reliable for a variety of reasons not least because the dimensions of the applicative product will change thereby causing the friction fit to be insufficient to hold the stick in place during application or if the receptacle is dropped accidentally.

The dimensions of applicative products, such as lipsticks, may change for any one or more of the following reasons:

(i) the effect of cooling the product, after introduction into the receiving base member, may cause the product to shrink;
(ii) the increased use of volatile ingredients within the formulations for stick type applicative products may again cause shrinkage problems;
(iii) the effect of agitation e.g. shaking during transportation can displace the stick from its holder and damage it;
(iv) mere general wear and tear usage, i.e. when a user drops the receptacle and dislodges the product; and
(v) the effect of temperature exposure during transportation and normal use.

In (ii) above, it will be appreciated that volatile ingredients tend to evaporate causing shrinkage. When this happens, a once proper friction fit (i.e. the physical engagement) between the receiving base member and the stick will no longer be sufficient to retain the stick in place. Once shrinkage has occurred to the point where the friction fit between the receiving base member and the product, e.g. a stick type applicative product such as a lipstick, is insufficient to hold the latter in place, or if the receptacle is dropped as suggested above, the stick type applicative product may disengage from the receiving base member rendering the product effectively unusable.

A variety of methods of physically anchoring stick products to respective receiving base members have been proposed. For example, some base members provide protrusions from the bottom or sides of the receiving base member to assist in retaining the stick within the base member. There remains an opportunity to provide improved stick products and methods making such products.

SUMMARY OF THE INVENTION

A suitable alternative to the above physical engagement means has now been identified for engaging stick type applicative products and/or cosmetic pressed powders inside a receiving base member of a receptacle for the products.

There is provided herein a method of adhering a product inside a receptacle for the product. The product is generally a cosmetic pressed powder product or a stick type applicative product. The receptacle comprises a casing having a top end and a base end with a receiving base member disposed at the base end. The receiving base member has an inner surface. In various embodiments, the receiving base member is adapted to be moveable inside the casing to advance and retract the product outside and inside the top end of the casing. The method comprises:

(i) applying a silicone hot melt adhesive composition in liquid form to at least part of the inner surface of the receiving base member;
(ii) inserting the product into the receiving base member on or in the silicone hot melt adhesive composition while still in liquid form (the silicone hot melt adhesive composition that is); and
(iii) allowing the silicone hot melt adhesive composition to cool, and optionally cure, to adhere the product inside the receptacle.

A retained-product comprising a product inside a receiving base member of a receptacle therefor is also provided. The product can be a cosmetic pressed powder product or a stick type applicative product. The retained-product can be formed via the method above.

DETAILED DESCRIPTION OF THE INVENTION

Referring to the method, step (i) may be performed at any suitable temperature for the hot melt adhesive composition chosen. The hot melt adhesive composition may also be referred to herein as the silicone hot melt adhesive, the hot melt adhesive, the hot melt, the adhesive, or the composition.

In general, step (i) will be performed by heating the hot melt adhesive composition to a temperature equal to or greater than the glass transition ($T_g$) of the composition, optionally to a temperature equal to or greater than the melting point ($T_m$) of the composition. Such temperatures can readily be determined via routine experimentation or via reference to preexisting technical data related to the composition. In various embodiments, the composition is heated to a temperature ranging from about 80° C. to about 200° C., optionally from about 80° C. to about 165° C.

Any suitable amount of the silicone hot melt adhesive may be introduced into the receiving base member. It may be provided in a continuous layer or a discontinuous layer, e.g. a patterned layer. For example, in the case of the latter, dots or beads of hot melt adhesive may be placed on the receiving base member if a continuous layer is not deemed necessary. The silicone hot melt adhesive may be introduced into the receiving base member in an amount ranging from about 0.5 to about 100 grams per square meter.

The product to be adhered in to the receiving base member can be placed either in or on the silicone hot melt adhesive therein providing adhesion occurs. If the bottom of the product is placed in the silicone hot melt adhesive, the adhesive is supplied in an amount to ensure sufficient adhesive bond forms around the bottom of the product. In the case of stick type applicative products, the bottom of the stick is directly placed on or inserted into the hot melt adhesive in the receiving base member. In the case of the compressed powder product, either the bottom of the compressed powder material when in the form of a compressed "cake" can be placed onto or into the hot melt to adhere the cake directly to the receiving base member. Alternatively, in the case of the compressed powder product, the powder product can be retained in one or more pans or the like, which pans may be made from any suitable material, e.g. a metal such as aluminium or a suitable plastic material, and it is the pan holding the compressed powder product which is adhered to the receiving base member based rather than the compressed powder product itself.

The silicone hot melt adhesive may be applied into the receiving base member by either a manual or automated process e.g. by extruding beads of adhesive onto the surface of the receiving base member. In the case of automated processes an automated, robotic dispenser may be utilised to dispense the silicone hot melt adhesive composition in liquid form to at least part of the inner surface of the receiving base member.

While the concept of adhering the stick type applicative product to the base may have previously seemed attractive, there has proven to be a major issue given a commonly preferred material used to make the receiving base member is polyoxymethylene (POM). POM is a thermoplastic material, also known as acetal, polyacetal and/or polyformaldehyde. POM is renowned as a difficult surface to chemically bond to and it has proven difficult to identify a suitable chemical material which is able to chemically adhere the stick to receiving base members made from POM.

Packaging materials used to make receptacles for cosmetic pressed powder products and stick type applicative products, such as lipsticks, are typically rigid in nature and often comprise thermoset and thermoplastic materials. The silicone hot melt adhesives herein are therefore useful for adhering the products themselves into receiving base members made of such materials in a fast manner. The silicone hot melt adhesives are not only useful in adhering stick type applicative products such as colour cosmetic lipsticks and pressed powders to their receptacles to prevent loosening and/or movement of e.g. the lipstick during transit or use, but also will serve to dampen movement e.g. during transportation and prevent slippage or release from the receptacle.

Advantages caused by the use of the silicone hot melt adhesive composition for the present application include:
1. The low surface energy of the adhesive results in the ability of the adhesive to both wet and adhere to difficult substrates, e.g. a receiving base member made from POM. This is important as there are hundreds of different product formulations and product receptacles, e.g. lipstick receptacles made from a variety of materials which are used for the stick products to be contained within.
2. Instant room temperature adhesion—will allow adhesion to cosmetic pressed powder products or stick type applicative products without impacting the formulation because the silicone hot melt material generally takes only a few minutes, e.g. 5 minutes, to cool from the temperature at which it is dispensed into the base member to ambient temperature (e.g. about 23° C. to about 25° C.) and because the hot melt material physically adheres to the base of the lipstick i.e., it does not depend on chemical adhesion due to a chemical reaction between the hot melt material and the base of the stick type product; therefore adhesion can be said to be "instantaneous."
3. Instant green strength.
4. The environmental health (EHS) profile relative to organic adhesives is much more favourable.
5. It has been noted that there is no noticeable discoloration of the adhesive after introduction of the stick; and because of thus, it can be inferred that the adhesive does not undesirably draw or absorb material(s) from the stick.
6. The ability to reduce the depth of the lipstick receptacle enabling a consumer to use more of the lipstick previously entrained in the base member and consequently unusable.

The instant green strength of the silicone adhesive allows for instant adhesion of the lipstick to the hot melt adhesive at low enough temperatures while not damaging the product e.g. lipstick. Green strength as defined herein generally means the strength of the adhesive used in the application before the adhesive has fully cooled and/or cured. Materials with good green strength are utilised in applications requiring strong initial bonds between a sealant/adhesive and a substrate. This method may be utilised to adhere any such cosmetic pressed powder product or stick type applicative product to the receiving base member of a receptacle. In the case of stick type applicative products, these may include, but are not limited to, lipsticks, deodorants, lip balms, make-up foundations, clear cosmetic sticks, anti-acne sticks, antiperspirants, solid perfumes, concealers, eye shadows, blushes, sunscreens, and the like, but is particularly directed towards the adhesion of lipsticks to the base members as hereinbefore described.

For purposes of clarity and sake of simplicity, this disclosure will be further described with respect to a lipstick. This is merely illustrative, and in no way limits the present invention to lipsticks. It will be apparent to one of ordinary skill in the art how the present disclosure can be adapted for use with any stick product such as those mentioned above and equally to cosmetic pressed powder products having suitable casings.

For the avoidance of doubt, a lipstick is a cosmetic product for the purpose of applying a colour to the lips and or texture and or protection to the lips. Primary ingredients in lipsticks are typically waxes e.g. beeswax, candelilla wax and carnauba wax which are used to enable lipstick to take its shape, oils e.g. mineral, caster, lanolin or vegetable oil, alcohol and pigments, fragrances and pigments and optionally preservatives and/or antioxidants. Lipsticks comprising the above are manufactured by melting the ingredients in more than one part, e.g. a wax part, an oil part, and a solvent part. In one process, solvent and oils are mixed together and if appropriate heated. Once thoroughly mixed together, suitable pigments are added and the resulting pigmented mixture is passed through a rolling mill in order to ensure the pigments are ground to a suitable level to ensure a smooth, e.g. non-grainy feel when applied onto lips. However, the latter process step is known to introduce unwanted air into the mixture and as such an air removal step is required after which the resulting pigmented mixture is then mixed with melted wax. The resulting product is subsequently strained and moulded by introduction into a suitable mold and allowed to cool and solidify. It is the acceptably moulded stick products which are then adhered to the receiving base member as described above using the silicone hot melt adhesive. The hot melt utilised should have the ability to create an adhesive bond with both the lipstick product and the inner surface of the receiving base member. The bond may be chemical, but is generally a physical bond based on initial green strength and maintenance of the adhesive bond during and subsequent to cooling of the adhesive to ambient temperature. It is to be appreciated that passive or active cooling may be utilized to lower temperature of the adhesive after the product is inserted thereon/in. For example, the adhesive may be allowed to cool naturally or a cooling means may be utilized, e.g. a fan, chilled air, etc.

The receiving base member may be made from (or comprise) any suitable material. Suitable materials are understood in the art, and include, for example, styrene butadiene (SB), styrene-acrylonitrile (SAN), acrylobutadiene-styrene (ABS), polyvinyl chlorides and derivatives thereof, polyacrylics (e.g. polymethylmethacrylate (PMMA)), polyamides (PA), saturated thermoplastic polyesters such as polyethylene terephthalate (PET), and polyoxymethylenes (POM). Mixtures of such materials can also be used. In various embodiments, the receiving base member is made from or comprises POM. The silicone hot melt adhesives herein are particularly suited to adhere the products (such as lipsticks) to receiving base members made from materials which are renowned to be difficult to adhere to (like POM). In certain embodiments, the retained-product comprises a product (e.g. lipstick) inside a POM-based receiving base member. In these embodiments, at least the inner surface of the receiving base member comprises POM.

Any suitable silicone based hot melt adhesive may be utilised. In various embodiments, the hot melt adhesive is self-leveling and has excellent green strength. Furthermore, the silicone based hot melt adhesive should be suitably compatible with the stick type applicative products or cosmetic pressed powders, for example lipsticks may include beeswax, candelilla wax, carnauba wax, castor oil, ozokerite, ceresin, cocoa butter, lard, cetyl alcohol, petroleum jelly and liquid paraffin. Organo-functional silicones such as silicone resins, and waxes may also be utilized in lipsticks. In many embodiments, the hot melt will not be chemically reactive with the lipstick but will, as previously indicated, adhere via a mechanical/physical mechanism and as such should be compatible with the products to be inserted into the receiving base member of the receptacle. However, if designed to chemically react with the applicative products or cosmetic pressed powders, the adhesive should be allowed to cure thereto.

In various embodiments, the hot melt adhesive composition comprises:
(1) a silicone resin having a silanol content of less than 2 wt. % and comprised of monofunctional units represented by $R^1_3SiO_{1/2}$ and tetrafunctional units represented by $SiO_{4/2}$ where $R^1$ is a monovalent substituted or unsubstituted hydrocarbon radical;
(2) an organopolysiloxane comprised of difunctional units of the formula $R^2R^3SiO$ and terminal units of the formula $R^4_aX'_{3-a}SiG$- wherein $R^2$ is an alkoxy group or a monovalent unsubstituted or substituted hydrocarbon radical; $R^3$ is a monovalent unsubstituted or substituted hydrocarbon radical; $R^4$ is an aminoalkyl or $R^1$ group, X' is a hydrolyzable group; G is a divalent group linking the silicon atom of the terminal unit with another silicon atom; and subscript a is 0 or 1;
(3) a silane moisture scavenger; and
(4) a catalyst.

Examples of suitable hot melt adhesive compositions which might be used herein comprise:
(1) about 55 to about 62 wt. % of the silicone resin;
(2) about 38 to about 45 wt. % of the organopolysiloxane;
(3) about 0.1 to about 5 wt. %, optionally about 0.9 to about 1.1 wt. %, of the silane moisture scavenger, and
(4) about 0.02 to about 2 wt. %, optionally about 0.1 to about 0.5 wt. %, of the catalyst.

It will be understood that the total wt. % of the composition is 100 wt. % for any suitable composition. In various embodiments, the composition may be referred to as a moisture curable silicone hot melt adhesive composition.

In certain embodiments, the hot melt adhesive composition has a viscosity of from about 5000 to about 130000 mPa·s at 125° C., optionally about 8000 to about 125000 mPa·s at 125° C.; optionally about 25000 to about 100000 mPa·s at 125° C., when measured at a frequency of 1 Hz using a rheometer equipped with 25-mm-diameter parallel-plate test geometry.

Silicone Resin

The silicone resin useful herein contains monofunctional units represented by $R^1_3SiO_{1/2}$ and tetrafunctional units represented by $SiO_{4/2}$. $R^1$ represents a monovalent substituted or unsubstituted hydrocarbon radical. Silicone resins of this type are understood in the art as one of the ingredients present in organosiloxane compositions used as pressure sensitive adhesives.

The silicone resin is soluble in liquid hydrocarbons such as benzene, toluene, xylene, heptane and the like or in liquid organosilicon compounds such as a low viscosity cyclic and linear polydiorganosiloxanes.

In the $R^1_3SiO_{1/2}$ unit, $R^1$ is a monovalent hydrocarbon radical containing up to 20 carbon atoms, optionally from 1 to 10 carbon atoms. Examples of suitable hydrocarbon radicals for $R^1$ include: alkyl radicals, such as methyl, ethyl, propyl, pentyl, octyl, undecyl and octadecyl; alkenyl radicals, such as vinyl, allyl and 5-hexenyl; cycloaliphatic radicals, such as cyclohexyl and cyclohexenylethyl; and aryl radicals, such as phenyl, tolyl, xylyl, benzyl, and 2-phenylethyl. Non-reactive substituents that can be present on $R^1$ include, but are not limited to, halogen and cyano. Substituted hydrocarbon radicals that can be represented by $R^1$ include, but are not limited to, chloromethyl and 3,3,3-trifluoropropyl.

At least one-third, optionally at least two-thirds, of the $R^1$ radicals in the $R^1_3SiO_{1/2}$ unit are methyl radicals. Examples of $R^1_3SiO_{1/2}$ units include, but are not limited to, $Me_3SiO_{1/2}$, $PhMe_2SiO_{1/2}$ and $Me_2ViSiO_{1/2}$ where Me, Ph and Vi denote methyl, phenyl and vinyl, respectively. The silicone resin may contain two or more of these units.

In various embodiments, the molar ratio of the $R^1_3SiO_{1/2}$ and $SiO_{4/2}$ units in the silicone resin is from about 0.5/1 to about 1.5/1, optionally from about 0.6/1 to about 0.9/1. These mole ratios are conveniently measured by $Si^{29}$ NMR spectroscopy. This technique is capable of quantitatively determining the concentration of $R^1_3SiO_{1/2}$ ("M") and $SiO_{4/2}$ ("Q") units derived from the silicone resin and from the neopentamer, $Si(OSiMe_3)_4$, present in the initial silicone resin, in addition to the total hydroxyl content of the silicone resin.

The $R^1_3SiO_{1/2}$ to $SiO_{4/2}$ ratio can be expressed as {M(resin)+M(neopentamer)}/{Q(resin)+Q(neopentamer)} and represents the ratio of the total number of triorganosiloxy groups of the resinous and neopentamer portions of the silicone resin to the total number of silicate groups in the resinous and neopentamer portions.

The silicone resin contains 2.0 wt. % or less, optionally 0.7 wt. % or less, optionally 0.3 wt. % or less, of terminal units represented by the formula $XSiO_{3/2}$, where X represents hydroxyl or a hydrolyzable group, e.g., alkoxy such as methoxy and ethoxy; alkenyloxy such as isopropenyloxy; ketoximo such as methyethylketoximo; carboxy such as acetoxy; amidoxy such as acetamidoxy; and aminoxy such as N,N-dimethylaminoxy. The concentration of silanol groups present in the silicone resin can be determined using Fourier transform infrared (FTIR) spectrophotometry.

The number average molecular weight, $M_n$, required to achieve the desired flow characteristics of the silicone resin will depend at least in part on the molecular weight of the silicone resin and the type(s) of hydrocarbon radicals, represented by $R^1$, that are present in this ingredient. $M_n$ as used herein represents the molecular weight measured using gel permeation chromatography, when the peak representing the neopentamer is excluded from the measurement. In various embodiments, the $M_n$ of the silicone resin is greater than about 3000, optionally is from about 4500 to about 7500. In general, the thermal hold (i.e. the ability of an adhesive to retain its adhesion at elevated temperatures) above 150° C., becomes appreciable when the $M_n$ exceeds 3000.

It is desirable that the silicon-bonded hydroxyl groups (i.e., $HOR^1SiO_{1/2}$ or $HOSiO_{3/2}$ groups) in the silicone resin be below 0.7% by weight, optionally below 0.3% by weight, of the total weight of the silicone resin. Silicon-bonded hydroxyl groups formed during preparation of the silicone resin are converted to trihydrocarbylsiloxy groups or a hydrolyzable group by reacting the silicone resin with a silane, disiloxane or disilazane containing the appropriate terminal group. Silanes containing hydrolyzable groups are generally added in excess of the quantity required to react with the silicon-bonded hydroxyl groups of the silicone resin.

Organopolysiloxane

The organopolysiloxane useful herein is comprised of difunctional units of the formula $R^2R^3SiO$ and terminal units of the formula $R^4_aX'_{3-a}SiG-$; where $R^2$ is an alkoxy group or a monovalent unsubstituted or substituted hydrocarbon radical; $R^3$ is a monovalent unsubstituted or substituted hydrocarbon radical; $R^4$ is an aminoalkyl or $R^1$ group; X' is a hydrolyzable group; G is an oxygen atom or a divalent group linking the silicon atom of the terminal unit with another silicon atom, and subscript a is 0 or 1. The organopolysiloxane can optionally contain up to 20%, based on total of trifunctional units of the formula $R^3SiO_{3/2}$ where $R^3$ is as described previously, e.g. where $R^3$ are lower alkyls such as methyl. At least 50%, optionally at least 80%, of the radicals represented by $R^2$ and $R^3$ in the $R^2R^3SiO$ units are lower alkyls such as methyl.

In various embodiments, the organopolysiloxane contains an average of two or more hydrolyzable (X') groups per molecule in order to form a crosslinked product. Hydrolyzable groups represented by X' include, but are not limited to, hydroxy, alkoxy such as methoxy and ethoxy, alkenyloxy such as isopropenyloxy, ketoximo such as methyethylketoximo, carboxy such as acetoxy, amidoxy such as acetamidoxy, and aminoxy such as N,N-dimethylaminoxy.

In the terminal groups, when subscript a is 0, the groups represented by X' can be alkoxy, ketoximo, alkenyloxy, carboxy, aminoxy or amidoxy. In other embodiments when subscript a is 1, X' is an alkoxy and $R^5$ is alkyl such as methyl or ethyl, or aminoalkyl such as aminopropyl or 3-(2-aminoethylamino)propyl. The amino portion of the aminoalkyl radical can be primary, secondary or tertiary.

In the formula for the terminal unit, G is a divalent group or atom that is hydrolytically stable. By hydrolytically stable, it is meant that it is not hydrolyzable and links the silicon atom(s) of the terminal unit to another silicon atom in the organopolysiloxane such that the terminal unit is not removed during curing of the composition and the curing reaction is not adversely affected. Hydrolytically stable linkages represented by G include, but are not limited to, oxygen, hydrocarbylene such as alkylene and phenylene, hydrocarbylene containing one or more hetero atoms selected from oxygen, nitrogen and sulfur, and combinations of these linking groups. In various embodiments, G can represent a silalkylene linkage such as $-(OSiMe_2)CH_2CH_2-$, $-(CH_2CH_2SiMe_2)(OSiMe_2)CH_2CH_2-$, $-(CH_2CH_2SiMe_2)O-$, $(CH_2CH_2SiMe_2)OSiMe_2)O-$, $-(CH_2CH_2SiMe_2)CH_2CH_2-$ and $-CH_2CH_2-$, a siloxane linkage such as $-(OSiMe_2)O-$, or an oxygen atom.

Specific examples of terminal units include, but are not limited to, $(MeO)_3SiCH_2CH_2-$, $(MeO)_3SiO-$, $Me(MeO)_2SiO-$, $H_2NCH_2CH_2N(H)(CH_2)_3SiO-$, $(EtO)_3SiO-$, $(MeO)_3SiCH_2CH_2SiMeCH_2SiMeCH_2CH_2SiMe_2O-$, $Me_2NOSiO-$, $MeC(O)N(H)SiO-$, and $CH_2=C(CH_3)OSiO-$. Me in these formulae represents methyl and Et represents ethyl.

When X' contains an alkoxy group, it may be desirable to separate this X' group from the closest siloxane unit by an alkylene radical such as ethylene. In this instance $R^4_aX'_{3-a}SiG-$ would be $(MeO)_3SiCH_2CH_2Si(Me_2)O-$. Methods for converting alkoxy groups to trialkoxysilylalkyl groups are described in the prior art. For example, moisture reactive groups having the formulae $(MeO)_3SiO-$ and $Me(MeO)_2SiO-$ can be introduced into a silanol-terminated polyorganosiloxane by compounds having the formulae $(MeO)_4Si$ and $Me(MeO)_3Si$, respectively. Alternatively, compounds having the formulae $(MeO)_3SiH$ and $Me(MeO)_2SiH$, respectively, can be used when the polyorganosiloxane contains silanol groups or alkenyl radicals such as vinyl and a platinum group metal or a compound thereof as a hydrosilylation reaction catalyst. It will be understood that other hydrolyzable groups such as dialkylketoximo, alkenyloxy and carboxy can replace the alkoxy group.

In various embodiments, the organopolysiloxane used in the hot melt adhesive is a polydimethylsiloxane containing three alkoxy or ketoximo groups, two ketoximo groups or two alkoxy groups together with either an alkyl or aminoalkyl radical.

In certain embodiments, the organopolysiloxane has a viscosity of from about 0.02 Pa·s to about 100 Pa·s, optionally about 0.35 to about 70 Pa-s, optionally about 1.0 to about 65 Pa·s, at 25° C., when measured using a rheometer equipped with an appropriate cone-and-plate test geometry for the viscosity range being measured.

In various embodiments, the silicone resin and organopolysiloxane are present in amounts to provide a weight ratio of (1) silicone resin to (2) organopolysiloxane, i.e., resin/polymer ratio, ranging from about 55/45 to about 70/30. The amount of silicone resin is the weight of silicone resin solids; however, the silicone resin may optionally be dissolved in a solvent. Alternatively, higher amounts of silicone resin can be used; however, higher application temperatures may be needed to apply the hot melt adhesive composition to the inner surface.

For the avoidance of doubt, it will be understood that because polysiloxane (ii) is substantially linear in structure it is not a resin. Conversely, resin (i) cannot be a siloxane such as polysiloxane (ii).

Silane Moisture scavenger

The silane moisture scavenger is represented by the formula $R^1{}_n SiZ_{(4-n)}$, where $R^1$ is as described previously and Z is a hydrolyzable group that reacts with the terminal groups of at least the organopolysiloxane under ambient conditions to form a cured material. Subscript n is 0, 1 or 2. In certain embodiments, $R^1$ is an alkyl and/or a phenyl group. Suitable hydrolyzable groups represented by Z include, but are not limited to, alkoxy containing from 1 to 4 carbon atoms, carboxy such as acetoxy, ketoximo such as methylethylketoximo and aminoxy. In various embodiments when subscript n is 2, in the silane moisture scavenger, the organopolysiloxane contain three X' groups (e.g., subscript a is 0).

Suitable silane moisture scavengers include, but are not limited to, methyltrimethoxysilane, isobutyltrimethoxysilane, methyltris(methylethylketoximo)silane, methyltriethoxysilane, isobutyltriethoxysilane, methyltriacetoxysilane, and alkyl orthosilicates such as ethyl orthosilicate.

In various embodiments, the amount of silane moisture scavenger used is in the range of about 0.1 to about 15 parts per hundred (pph), optionally about 0.1 to about 5 pph, based on the amount of silicone resin and polymer. If too much silane moisture scavenger is present, the green strength and/or cure rate of the hot melt adhesive will decrease. If the silane moisture scavenger is volatile it may be necessary to use an excess amount to achieve the 0.1 to 15 pph in the final hot melt adhesive composition. One skilled in the art will be able to determine the amount needed to produce a composition with 0.1 to 15 pph.

Catalyst

In various embodiments, a titanate or zirconate catalyst is used in the hot melt adhesive composition. The catalysts may comprise a compound according to the general formula $Ti[OR^{22}]_4$ where each $R^{22}$ may be the same or different and represents a monovalent, primary, secondary or tertiary aliphatic hydrocarbon group which may be linear or branched containing from 1 to 10 carbon atoms. Optionally, the titanate may contain partially unsaturated groups. Examples of $R^{22}$ include, but are not limited to, methyl, ethyl, propyl, isopropyl, butyl, tertiary butyl and a branched secondary alkyl group such as 2,4-dimethyl-3-pentyl. In certain embodiments where each $R^{22}$ is the same, $R^{22}$ is an isopropyl, a branched secondary alkyl group or a tertiary alkyl group, in particular, tertiary butyl.

The titanate/zirconate may be chelated. The chelation may be with any suitable chelating agent such as an alkyl acetylacetonate such as methyl or ethylacetylacetonate. A titanate catalyst may be an organotitanium compound such as tetrabutyl titanate and partially chelated derivatives of these salts with chelating agents such as acetoacetic acid esters and beta-diketones.

In various embodiments, the amount of catalyst used is in the range of about 0.02 pph to about 2 pph, optionally in the range of 0.05 pph to 1 pph, based on the amount of silicone resin and organopolysiloxane. If too much catalyst is added, then the cure of composition will be impaired. Additionally, as the amount of catalyst is increased, the viscosity of the hot melt adhesive increases resulting in a higher melt temperature required to apply the material.

Adhesion Promoter

In certain embodiments, the hot melt adhesive composition may contain about 0.05 pph to about 2 pph, based on the amount of silicone resin and organopolysiloxane, of an adhesion promoter. Adhesion promoters are understood in the art and can be silanes having the formula $R^5{}_c R^6{}_d Si(OR)_{4-(c+d)}$ where $R^5$ is independently a monovalent substituted or unsubstituted, hydrocarbon group having at least three carbon atoms and $R^6$ contains at least one SiC bonded group having an adhesion-promoting group, such as amino, epoxy, mercapto or acrylate groups. Subscript c has the value of 0 to 2, subscript d is either 1 or 2, and the sum of c+d is not greater than 3. The adhesion promoter can also be a partial condensate of the above silane.

Stabilizer

The hot melt adhesive composition may optionally further comprise a stabilizer. One skilled in the art would be able to select a suitable stabilizer and amount. For example, TINUVIN® products (such as TINUVIN® 765) from Ciba Specialty Chemicals are commercially available UV and light stabilizers. The exact amount of stabilizer depends on the type of stabilizer selected and the end use of the hot melt adhesive composition, however about 0.1 to about 4 wt. %, optionally up to about 0.15 wt. %, stabilizer based on the weight of the hot melt adhesive composition may be added.

Pigment

The hot melt adhesive composition may optionally further comprise a pigment. The amount of pigment depends on the type of pigment selected and the desired degree of coloration of the cooled and/or cured hot melt adhesive. For example, the hot melt adhesive composition may comprise greater than 0 to 5 wt. %, optionally up to 2 wt. %, of a pigment (such as carbon black) based on the weight of the composition.

Filler

The hot melt adhesive composition may contain, as optional constituents, other ingredients which are conventional to the formulation of silicone rubber sealants and the like. For example, the compositions will normally contain one or more finely divided, reinforcing fillers such as high surface area fumed and precipitated silicas including rice hull ash and to a degree calcium carbonate as discussed above, or additional non-reinforcing fillers such as crushed quartz, diatomaceous earths, barium sulphate, iron oxide, titanium dioxide and carbon black, talc, wollastonite. Other fillers which might be used alone or in addition to the above include aluminite, calcium sulphate (anhydrite), gypsum, calcium sulphate, magnesium carbonate, clays such as kaolin, aluminium trihydroxide, magnesium hydroxide (brucite), graphite, copper carbonate, e.g. malachite, nickel carbonate, e.g. zarachite, barium carbonate, e.g. witherite and/or strontium carbonate e.g. strontianite.

Further fillers include aluminium oxide, silicates from the group consisting of olivine group; garnet group; aluminosilicates; ring silicates; chain silicates; and sheet silicates. The olivine group comprises silicate minerals, such as but not limited to, forsterite and $Mg_2SiO_4$. The garnet group comprises ground silicate minerals, such as but not limited to, pyrope; $Mg_3Al_2Si_3O_{12}$; grossular; and $Ca_2Al_2Si_3O_{12}$. Aluminosilicates comprise ground silicate minerals, such as but not limited to, sillimanite; $Al_2SiO_5$; mullite; $3Al_2O_3.2SiO_2$; kyanite; and $Al_2SiO_5$. The ring silicates group comprises silicate minerals, such as but not limited to, cordierite and $Al_3(Mg,Fe)_2[SiAlO_{18}]$. The chain silicates group comprises ground silicate minerals, such as but not limited to, wollastonite and $Ca[SiO_3]$. The sheet silicates group comprises silicate minerals, such as but not limited to, mica; $K_2Al_{14}[Si_6Al_2O_{20}](OH)_4$; pyrophyllite; $Al_4[Si_8O_{20}](OH)_4$; talc; $Mg_6[Si_8O_{20}](OH)_4$; serpentine for example, asbestos; Kaolinite; $Al_4[Si_4O_{10}](OH)_8$; and vermiculite.

In addition, a surface treatment of the filler(s) may be performed, for example with a fatty acid or a fatty acid ester such as a stearate, or with organosilanes, organosiloxanes, or organosilazanes hexaalkyl disilazane or short chain siloxane diols to render the filler(s) hydrophobic and therefore easier to handle and obtain a homogeneous mixture with the other components. The surface treatment of the fillers makes the ground silicate minerals easily wetted by the silicone components. These surface modified fillers do not clump, and can be homogeneously incorporated into the composition.

The proportion of such fillers when employed will depend on the properties desired in the composition. In various embodiments, the filler content of the composition is in the range of from about 2 to about 15 wt. %, optionally from 5 to 10 wt. %, of the hot melt adhesive composition.

Rheology Modifier

Rheology modifiers may be provided. Any suitable rheology modifier may be used, for example nonreactive waxes and/or reactive waxes. If utilized, the rheology modifier(s) can be used in various amounts.

Optical Brightener

Optical (fluorescent) brightener may be utilised to aid quality/process control inspection: under UV radiation it will fluoresce and emit light in the blue region of the visible spectrum. These may include stilbenes, e.g., 4 4'-bis(benzoxazolyl)-cis-stilbene and/or (2,5-thiophenediylbis(5-tert-butyl-1,3-benzoxazole). If utilized, the brightener(s) can be used in various amounts.

Tackifier

Suitable tackifier resins may also be used should the need arise. If utilized, the tackifier(s) can be used in various amounts.

INDUSTRIAL APPLICABILITY

As previously indicated, the method herein may be used for any suitable cosmetic pressed powder products. Similarly, the method can also be used for any suitable stick type applicative product. Examples of a suitable stick type applicative product include a lipstick, a deodorant, a lip balm, a make-up foundation, a clear cosmetic stick, an anti-acne stick, an antiperspirant, a solid perfume, a concealer, an eye shadow, a blush, a sunscreen, and an adhesive stick.

The present disclosure will now be further explained with the help of the following Examples. The following Examples, illustrating the silicone hot melt adhesives and method, are intended to illustrate and not to limit the invention.

EXAMPLES

Polyoxymethylene (POM) based polymers/copolymers are often the materials used in the construction of lipstick receiving bases as hereinbefore described. They are also known to be difficult to adhere other materials to. As such, the substrate used for the initial trials was a white Delrin® acetal resin from Dupont. Rectangular shaped bars 0.3175 cm thick and 2.54 cm wide were cut into 7.62 cm long "coupons."

Two commercial silicone hot melt adhesives were selected for the feasibility study: Dowsil™ CPA-1422 and Dowsil™ CPA-1442. Dowsil™ CPA-1422 provides higher green strength (mechanical strength before full cure is achieved) while Dowsil™ CPA-1442 has a lower viscosity to provide more dispensing options. Specifically, Dowsil™ CPA-1422 has a viscosity of about 1100 Poise 120° C. (according to CTM 0719) and a Green Strength of about 6 Psi at 15 minutes (according to CTM 0243). Dowsil™ CPA-1442 has a viscosity of about 240 Poise 120° C. (according to CTM 0719) and a Green Strength of about 0.6 Psi at 15 minutes (according to CTM 0243). It is contemplated that other adhesives commercially available under the trademark Dowsil™ are also suitable for the purposes of this disclosure.

Two Commercial lipstick samples were cut into 6.35 mm high test specimens.

Beads of each silicone hot melt adhesive were extruded out of a 6.35 mm nozzle onto the surface of a white Delrin® acetal resin coupon from 300-mL aluminium cartridges at a temperature of about 121° C. using a Bühnen HB 710 pneumatic driven manual hot-melt applicator.

Each Delrin® coupon with adhered lipstick was immediately flipped through 180° to demonstrate that the hot melt adhesive was strong enough to hold the lipstick in place, i.e. had sufficient green strength. It was observed that adhesive beads were big enough to completely surround the bottom of the lipstick bullet and approximately 1.6 mm of silicone hot melt adhesive remained around the base of the lipstick specimen.

It was identified that it was easier to compress the lipstick specimens into the Dowsil™ CPA-1442 bead compared to Dowsil™ CPA-1422. This was ascribed to Dowsil™ CPA-1442 having a lower viscosity and green strength.

In a further test, a smaller amount of silicone hot melt adhesive was used. The silicone hot melt adhesive was dispensed onto a piece of white "butcher" paper. The connecting end (flat) of a syringe was swirled into the hot melt and the material was then 'dabbed' onto the Delrin® coupon and the lipstick bullets adhered. In this test, there was no visible amount of adhesive around the lipstick sample. Coupons were again immediately flipped through 180° to demonstrate that the hot melt was strong enough to hold the lipstick in place and then shaken, to try to dislodge the lipstick sample, but it stayed in place.

As a test for the ease of reworkability, the lipstick samples were removed from the hot melt adhesive cohesively, by gently pushing on the lipstick sample to try to dislodge it from the adhesive. As lipstick was left on the adhesive once the sample was removed, it was determined that reworking the lipstick sample would be possible.

Assembled coupons were placed in a 40° C. forced-convection oven to determine if adhesive discoloration would occur. No discoloration occurred after two weeks at 40° C.

It was felt that given the results above, it would be optimum to use an automated, robotic dispensing system for commercial use of these materials. As a result of this decision, a laboratory trial was undertaken using an automated, robotic dispensing option.

First Lab Trial
Equipment:
  Nordson Unity™ IC300 dispensing system
  Unity nozzle 0.84 mm internal diameter (I.D.)
  51 psi (351.6 kPa) & Temperature set point to heat the hot melt container 140° C.
Material:
  Dowsil™ EA-4600 HM RTV BLACK UV
  This material is a one-component, neutral (moisture) cure, silicone hot melt adhesive. This material has a viscosity of about 60 Pa·s at 125° C. (according to CTM 1134). Another suitable material of similar composition is Dowsil™ EA-4600 LV HM RTV Translucent, which has a viscosity of about 25000 mPa·s at 100° C. (according to CTM 1134). A further suitable material of similar composition is Dowsil™ CPA-4600.
Procedure:
  A robot was programmed to dispense the silicone hot melt adhesive inside receiving base members of lipstick receptacle samples with the receiving base member fully extended. A circular and crisscross pattern was used to dispense the silicone hot melt adhesive into the bottom center of the lipstick receiving base member. Six receiving base member were dispensed into.
  The following robotic movement rates were used and the following mass of material dispensed into the holders recorded:

| #1 | 2 mm/s | 0.192 g |
| #2 | 5 mm/s | 0.058 g |
| #3 | 4 mm/s | 0.089 g |
| #4 | 5 mm/s | 0.099 g |
| #5 | 5 mm/s | 0.071 g |
| #6 | 5 mm/s | 0.072 g |

4 and #5 were programmed to cut the tail of material on the edge of the lipstick holder.
Second Lab trial
Equipment:
  Nordson Unity™ IC300 dispensing system
  Unity nozzle 0.84 mm (I.D.)
  51 psi (351.6 kPa) and 140° C. set point
Material:
  Dowsil™ CPA-1422
Procedure:
  The Nordson Unity™ IC300 dispensing system was used to heat the silicone hot melt adhesive and dispense, but in this case, no robotic movement was programmed. The silicone hot melt adhesive was applied by manually opening and closing the Nordson valve at the end of the valve into the receiving base members of lipstick receptacle samples and then the lipstick was inserted into each receiving base member with the hot melt by hand.
  Approximately, 0.10 g+/−0.04 g was applied to each lipstick receiving base member.
  Once the lipstick samples were adhered to the receiving base member of a receptacle, samples were tested to determine how they would react to being dropped by a user. A one meter long tube slightly larger than the diameter of the receptacle was used to drop sample receptacles containing lipstick so that it would impact the floor directly.
  Approximately, 10 lipstick tubes were used some with hot melt applied to hold the lipstick and some without hot melt.
  Qualitative observations indicated the lipstick with the hot melt applied had less failures due to separation and/or breakage than lipstick without hot melt applied.

The following additional embodiments are provided, the numbering of which is not to be construed as designating levels of importance. It is to be appreciated that examples of suitable products, receptacles, steps, silicone hot melt adhesive compositions, components and amounts thereof, etc., are as described above.

Embodiment 1 relates to a method of adhering a product inside a receptacle for the product, wherein the product is a cosmetic pressed powder product or a stick type applicative product, the receptacle comprises a casing having a top end and a base end with a receiving base member disposed at the base end, and the receiving base member has an inner surface, optionally wherein the base member is adapted to be moveable inside the casing to advance and retract the product outside and inside the top end of the casing, said method comprising:

(i) applying a silicone hot melt adhesive composition in liquid form to at least part of the inner surface of the receiving base member of the receptacle;

(ii) inserting the product into the receiving base member on or in the silicone hot melt adhesive composition while still in liquid form; and (iii) allowing the silicone hot melt adhesive composition to cool, and optionally cure, to adhere the product inside the receptacle.

Embodiment 2 relates to Embodiment 1, wherein the silicone hot melt composition is applied in step (i) by heating the silicone hot melt adhesive composition to a temperature of from about 80° C. to about 165° C.

Embodiment 3 relates to Embodiment 1 or Embodiment 2, wherein the silicone hot melt adhesive composition is introduced into the receiving base member in step (ii) in an amount of from about 0.5 to about 100 grams per square meter (g/m$^2$).

Embodiment 4 relates to any one of the preceding Embodiments, wherein the receiving base member is formed from a material selected from the group consisting of styrene butadiene (SB), styrene-acrylonitrile (SAN), acrylobutadiene-styrene (ABS), polyvinyl chlorides and derivatives thereof, polyacrylics, polyamides (PA), saturated thermoplastic polyesters, polyoxymethylene (POM), and combinations thereof.

Embodiment 5 relates to any one of the preceding Embodiments, wherein the silicone hot melt adhesive is applied in step (i) by extruding beads or dots of the silicone hot melt adhesive composition onto at least part of the inner surface of the receiving base member.

Embodiment 6 relates to any one of Embodiments 1 to 4, wherein the silicone hot melt adhesive composition is applied in step (i) using an automated, robotic dispenser to dispense the silicone hot melt adhesive composition in liquid form to at least part of the inner surface of the receiving base member.

Embodiment 7 relates to any one of the preceding Embodiments, wherein the silicone hot melt adhesive composition comprises: a silicone resin having a silanol content of less than 2 wt. %, and comprised of monofunctional units represented by $R^1_3SiO_{1/2}$ and tetrafunctional units represented by $SiO_{4/2}$ where $R^1$ is a monovalent substituted or unsubstituted hydrocarbon radical; an organopolysiloxane comprised of difunctional units of the formula $R^2R^3SiO$ and terminal units of the formula $R^4{}_aX'_{3-a}SiG$- where $R^2$ is an alkoxy group or a monovalent unsubstituted or substituted hydrocarbon radical, $R^3$ is a monovalent unsubstituted or substituted hydrocarbon radical, $R^4$ is an aminoalkyl or $R^1$ group, X' is a hydrolyzable group, G is a divalent group linking the silicon atom of the terminal unit with another silicon atom, and subscript a is 0 or 1; a silane moisture scavenger; and a catalyst.

Embodiment 8 relates to Embodiment 7, wherein the silicone hot melt adhesive composition comprises: about 55 to about 62 wt. % of the silicone resin; about 38 to about 45 wt. % of the organopolysiloxane; about 0.1 to about 5 wt. %, optionally about 0.9 to about 1.1 wt. %, of the silane moisture scavenger; and about 0.02 wt. % to about 2 wt. %, optionally about 0.1 wt. % to about 0.5 wt. %, of the catalyst.

Embodiment 9 relates to any one of the preceding Embodiments, wherein step (iii) further includes curing the silicone hot melt adhesive composition by exposing the silicone hot melt adhesive composition to moisture.

Embodiment 10 relates to any one of the preceding Embodiments, wherein the silicone hot melt adhesive composition is not chemically reactive towards the product.

Embodiment 11 relates to any one of the preceding Embodiments, wherein the product is the stick type applicative product and the stick type applicative product is selected from a lipstick, a deodorant, a lip balm, a make-up foundation, a clear cosmetic stick, an anti-acne stick, an antiperspirant, a solid perfume, a concealer, an eye shadow, a blush, a sunscreen, or an adhesive stick.

Embodiment 12 relates to any one of the preceding Embodiments, wherein the product is the compressed powder product and in step ii) a bottom of the compressed powder product is either placed in or on the silicone hot melt adhesive composition in the receiving base member or is first retained in a pan and the pan is either placed in or on the silicone hot melt adhesive composition in the receiving base member.

Embodiment 13 relates to any one of the preceding Embodiments, wherein the product is the stick type applicative product and in step ii) a bottom of the stick type applicative product is either placed directly in or on the silicone hot melt adhesive composition in the receiving base member.

Embodiment 14 relates to a retained-product comprising a cosmetic pressed powder product or a stick type applicative product inside a receiving base member of a receptacle, wherein the product is adhered inside the receptacle according to the method of any one of the preceding Embodiments.

Embodiment 15 relates to use of a silicone hot melt adhesive composition to adhere a cosmetic pressed powder product or a stick type applicative product inside a receiving base member of a receptacle therefor, optionally wherein the stick type applicative product is a lipstick, a deodorant, a lip balm, a make-up foundation, a clear cosmetic stick, an anti-acne stick, an antiperspirant, a solid perfume, a concealer, an eye shadow, a blush, a sunscreen, or an adhesive stick.

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A method of adhering a product inside a receptacle for the product, wherein the product is a cosmetic pressed powder product or a stick type applicative product, the receptacle comprises a casing having a top end and a base end with a receiving base member disposed at the base end, and the receiving base member has an inner surface, wherein the base member is adapted to be moveable inside the casing to advance and retract the product outside and inside the top end of the casing, said method comprising:
(i) applying a silicone hot melt adhesive composition in liquid form to at least part of the inner surface of the receiving base member of the receptacle;
(ii) inserting the product into the receiving base member on or in the silicone hot melt adhesive composition while still in liquid form; and
(iii) allowing the silicone hot melt adhesive composition to cool, and optionally cure, to adhere the product inside the receptacle.

2. The method of claim 1, wherein the silicone hot melt composition is applied in step (i) by heating the silicone hot melt adhesive composition to a temperature of from about 80° C. to about 165° C.

3. The method of claim 1, wherein the silicone hot melt adhesive composition is introduced into the receiving base member in step (ii) in an amount of from about 0.5 to about 100 grams per square meter (g/m$^2$).

4. The method of claim 1, wherein the receiving base member is formed from a material selected from the group consisting of styrene butadiene (SB), styrene-acrylonitrile (SAN), acrylobutadiene-styrene (ABS), polyvinyl chlorides and derivatives thereof, polyacrylics, polyamides (PA), saturated thermoplastic polyesters, polyoxymethylene (POM), and combinations thereof.

5. The method of claim 1, wherein the silicone hot melt adhesive is applied in step (i) by extruding beads or dots of the silicone hot melt adhesive composition onto at least part of the inner surface of the receiving base member.

6. The method of claim 1, wherein the silicone hot melt adhesive composition is applied in step (i) using an automated, robotic dispenser to dispense the silicone hot melt adhesive composition in liquid form to at least part of the inner surface of the receiving base member.

7. The method of claim 1, wherein the silicone hot melt adhesive composition comprises:
a silicone resin having a silanol content of less than 2 wt. %, and comprised of monofunctional units represented by $R^1_3SiO_{1/2}$ and tetrafunctional units represented by $SiO_{4/2}$ where $R^1$ is a monovalent substituted or unsubstituted hydrocarbon radical;
an organopolysiloxane comprised of difunctional units of the formula $R^2R^3SiO$ and terminal units of the formula $R^4_aX'_{3-a}SiG$- where $R^2$ is an alkoxy group or a monovalent unsubstituted or substituted hydrocarbon radical, $R^3$ is a monovalent unsubstituted or substituted hydrocarbon radical, $R^4$ is an aminoalkyl or $R^1$ group, X' is a hydrolyzable group, G is a divalent group linking the silicon atom of the terminal unit with another silicon atom, and subscript a is 0 or 1;
a silane moisture scavenger; and
a catalyst.

8. The method of claim 7, wherein the silicone hot melt adhesive composition comprises:
about 55 to about 62 wt. % of the silicone resin;
about 38 to about 45 wt. % of the organopolysiloxane;
about 0.1 to about 5 wt. %, optionally about 0.9 to about 1.1 wt. %, of the silane moisture scavenger; and
about 0.02 to about 2 wt. %, optionally about 0.1 to about 0.5 wt. %, of the catalyst.

9. The method of claim 1, wherein step (iii) further includes curing the silicone hot melt adhesive composition by exposing the silicone hot melt adhesive composition to moisture.

10. The method of claim 1, wherein the silicone hot melt adhesive composition is not chemically reactive towards the product.

11. The method of claim 1, wherein the product is the stick type applicative product and the stick type applicative product is selected from a lipstick, a deodorant, a lip balm, a make-up foundation, a clear cosmetic stick, an anti-acne stick, an antiperspirant, a solid perfume, a concealer, an eye shadow, a blush, a sunscreen, or an adhesive stick.

12. The method of claim 1, wherein the product is the compressed powder product and in step (ii) a bottom of the compressed powder product is either placed in or on the silicone hot melt adhesive composition in the receiving base member or is first retained in a pan and the pan is either placed in or on the silicone hot melt adhesive composition in the receiving base member.

13. The method of claim 1, wherein the product is the stick type applicative product and in step (ii) a bottom of the stick type applicative product is either placed directly in or on the silicone hot melt adhesive composition in the receiving base member.

14. A retained-product comprising a cosmetic pressed powder product or a stick type applicative product inside a receiving base member of a receptacle, wherein the product is adhered inside the receptacle according to the method of claim 1.

15. The retained-product of claim 14, wherein the stick type applicative product is adhered inside the receiving base member and wherein the stick type applicative product is a lipstick, a deodorant, a lip balm, a make-up foundation, a clear cosmetic stick, an anti-acne stick, an antiperspirant, a solid perfume, a concealer, an eye shadow, a blush, a sunscreen, or an adhesive stick.

16. The method of claim 1, wherein the silicone hot melt adhesive cures to adhere the product inside the receptacle.

17. The method of claim 8, wherein the silicone hot melt adhesive composition comprises:
i) about 0.9 to about 1.1 wt. % of the silane moisture scavenger;
ii) about 0.1 to about 0.5 wt. % of the catalyst; or
iii) both i) and ii).

18. A method of adhering a product inside a receptacle for the product, wherein the product is a cosmetic pressed powder product or a stick type applicative product, the receptacle comprises a casing having a top end and a base end with a receiving base member disposed at the base end, and the receiving base member has an inner surface, optionally wherein the base member is adapted to be moveable inside the casing to advance and retract the product outside and inside the top end of the casing, said method comprising:
(i) applying a silicone hot melt adhesive composition in liquid form to at least part of the inner surface of the receiving base member of the receptacle;

(ii) inserting the product into the receiving base member on or in the silicone hot melt adhesive composition while still in liquid form; and (iii) allowing the silicone hot melt adhesive composition to cool, and optionally cure, to adhere the product inside the receptacle;

wherein the silicone hot melt adhesive composition is introduced into the receiving base member in step (ii) in an amount of from about 0.5 to about 100 grams per square meter ($g/m^2$).

19. The method of claim 18, wherein the silicone hot melt adhesive composition comprises:

a silicone resin having a silanol content of less than 2 wt. %, and comprised of monofunctional units represented by $R^1_3SiO_{1/2}$ and tetrafunctional units represented by $SiO_{4/2}$ where $R^1$ is a monovalent substituted or unsubstituted hydrocarbon radical;

an organopolysiloxane comprised of difunctional units of the formula $R^2R^3SiO$ and terminal units of the formula $R^4_aX'_{3-a}SiG$- where $R^2$ is an alkoxy group or a monovalent unsubstituted or substituted hydrocarbon radical, $R^3$ is a monovalent unsubstituted or substituted hydrocarbon radical, $R^4$ is an aminoalkyl or $R^1$ group, X' is a hydrolyzable group, G is a divalent group linking the silicon atom of the terminal unit with another silicon atom, and subscript a is 0 or 1;

a silane moisture scavenger; and a catalyst.

20. A method of adhering a product inside a receptacle for the product, wherein the product is a cosmetic pressed powder product or a stick type applicative product, the receptacle comprises a casing having a top end and a base end with a receiving base member disposed at the base end, and the receiving base member has an inner surface, optionally wherein the base member is adapted to be moveable inside the casing to advance and retract the product outside and inside the top end of the casing, said method comprising:

(i) applying a silicone hot melt adhesive composition in liquid form to at least part of the inner surface of the receiving base member of the receptacle;

(ii) inserting the product into the receiving base member on or in the silicone hot melt adhesive composition while still in liquid form; and (iii) allowing the silicone hot melt adhesive composition to cool, and optionally cure, to adhere the product inside the receptacle;

wherein the silicone hot melt adhesive composition comprises:

a silicone resin having a silanol content of less than 2 wt. %, and comprised of monofunctional units represented by $R^1_3SiO_{1/2}$ and tetrafunctional units represented by $SiO_{4/2}$ where $R^1$ is a monovalent substituted or unsubstituted hydrocarbon radical;

an organopolysiloxane comprised of difunctional units of the formula $R^2R^3SiO$ and terminal units of the formula $R^4_aX'_{3-a}SiG$- where $R^2$ is an alkoxy group or a monovalent unsubstituted or substituted hydrocarbon radical, $R^3$ is a monovalent unsubstituted or substituted hydrocarbon radical, $R^4$ is an aminoalkyl or $R^1$ group, X' is a hydrolyzable group, G is a divalent group linking the silicon atom of the terminal unit with another silicon atom, and subscript a is 0 or 1;

a silane moisture scavenger; and a catalyst.

21. The method of claim 20, wherein the silicone hot melt adhesive composition comprises:

about 55 to about 62 wt. % of the silicone resin;

about 38 to about 45 wt. % of the organopolysiloxane;

about 0.1 to about 5 wt. %, optionally about 0.9 to about 1.1 wt. %, of the silane moisture scavenger; and about 0.02 to about 2 wt. %, optionally about 0.1 to about 0.5 wt. %, of the catalyst.

* * * * *